(12) United States Patent
Neudorf et al.

(10) Patent No.: US 7,395,770 B2
(45) Date of Patent: Jul. 8, 2008

(54) AGRICULTURAL ADDITIVE DISPENSING APPARATUS

(75) Inventors: Blake R Neudorf, Warman (CA); Trevor L Kowalchuk, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 11/566,709

(22) Filed: Dec. 5, 2006

(65) Prior Publication Data

US 2007/0084386 A1    Apr. 19, 2007

Related U.S. Application Data

(62) Division of application No. 11/047,134, filed on Jan. 31, 2005, now Pat. No. 7,213,523.

(51) Int. Cl.
*A01C 7/00* (2006.01)
*A01C 9/00* (2006.01)
*A01C 23/00* (2006.01)

(52) U.S. Cl. .................. 111/121; 111/123; 111/129; 111/187; 111/188

(58) Field of Classification Search .................. 111/123, 111/129, 118, 121, 188, 187
See application file for complete search history.

(56) References Cited

U.S. PATENT DOCUMENTS

| | | | |
|---|---|---|---|
| 31,753 A | 3/1861 | Stamm | |
| 1,416,331 A | 5/1922 | Campbell | |
| 1,555,881 A | 10/1925 | Schardt | |
| 3,439,636 A | 4/1969 | Lemke | |
| 4,194,576 A | 3/1980 | Graber | |
| 4,538,532 A | 9/1985 | Coker | |
| 4,628,840 A | 12/1986 | Jacobson | |
| 4,656,957 A | 4/1987 | Willamson et al. | |
| 5,027,724 A | 7/1991 | Placek et al. | |
| 5,531,171 A | 7/1996 | Whitesel et al. | |
| RE36,243 E | 7/1999 | Rawson et al. | |
| 6,006,684 A | 12/1999 | Whalen et al. | |
| 6,425,445 B1 | 7/2002 | Tarver, III | |
| 6,745,709 B2 | 6/2004 | Rowlett et al. | |
| 6,990,911 B2 | 1/2006 | Schneider | |
| 2002/0043198 A1 | 4/2002 | Swab et al. | |
| 2005/0241554 A1 | 11/2005 | Sauder et al. | |
| 2005/0274309 A1 | 12/2005 | Bergen | |

*Primary Examiner*—Christopher J. Novosad
(74) *Attorney, Agent, or Firm*—Rebecca Henkel

(57) ABSTRACT

A ground working apparatus for dispensing an agricultural additive to the soil is provided. The apparatus is mounted to a tool bar that is operable to be towed across an agricultural field. The apparatus includes a coulter blade in combination with a knife element, and a conduit attached thereto operable to dispense the agricultural additive in the soil. The knife element and the coulter blade characterize a gap therebetween. The gap is defined by a forward edge of the knife element having a radius of curvature that is less than a radius of curvature of the coulter blade. The conduit in interchangeably attached by at least one conduit mount plate at the knife element.

2 Claims, 5 Drawing Sheets

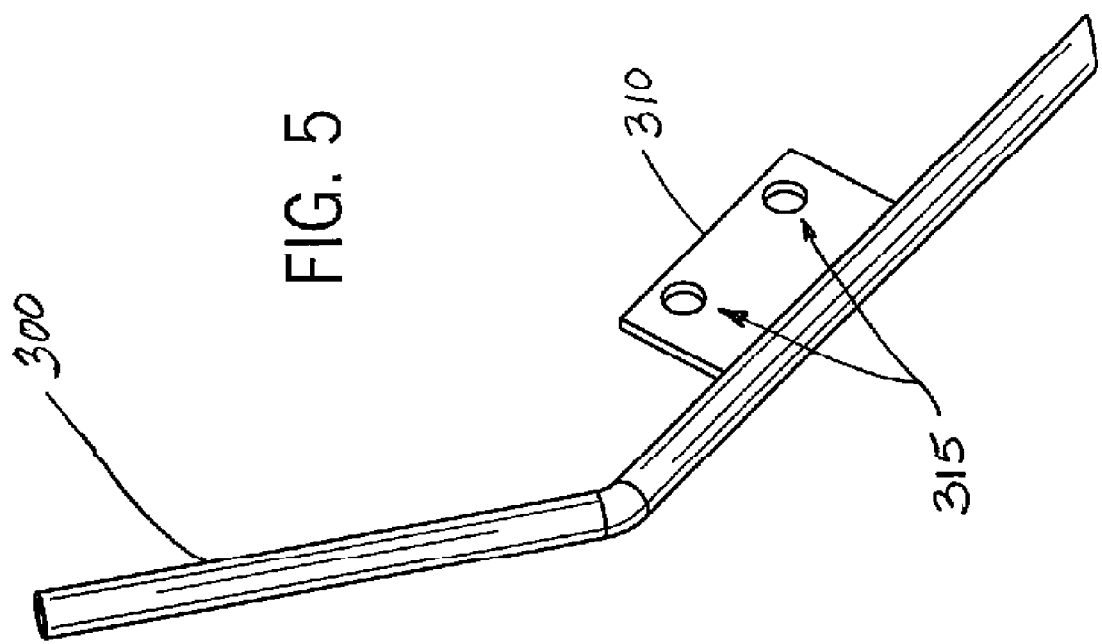

AGRICULTURAL ADDITIVE DISPENSING APPARATUS

CROSS REFERENCE TO RELATED APPLICATIONS

This patent application is a Divisional of, and claims priority to under 35 U.S.C. §120, U.S. patent application Ser. No. 11/047,134, filed on Jan. 31, 2005, entitled, "Agricultural Additive Dispensing Apparatus" and having Blake R. Neudorf and Trevor L. Kowalchuk as the Inventors. The full disclosure of U.S. patent application Ser. No. 11/047,134 is hereby fully incorporated by reference.

FIELD OF THE INVENTION

The invention relates to an agricultural additive dispensing apparatus, more specifically, relates to combination knife and coulter apparatus having a knife configured to reduce plugging opportunities and enhance dispensing of agricultural additives to the ground.

BACKGROUND OF THE INVENTION

A wide variety of agricultural implements have evolved that are configured to be self-driven or pulled by a tow vehicle across an agricultural field. These agricultural implements employ various ground working apparatuses with tools that have evolved for use in conditioning and improving utilization of seed beds for planting in various soil conditions.

Particularly in regard to row type planting, ground working apparatuses employ a variety of tools that have evolved to create spaced rows so as to achieve the best possible utilization of the soil area, as well as to allow field trash to pass between the ground working tools while the implement is pulled by a tow vehicle across the field. Towards this end, known ground working apparatuses of tools have been designed to dispense additives in the soil while the implement distributes seed across the field.

One such known ground working apparatus includes a coulter blade and a knife positioned close behind. The coulter blade is generally configured to slice through the soil, crop residue, sod, etc., while the knife following close behind carries a conduit or tube employed for dispensing additives (e.g., liquid or dry fertilizer, herbicides, pesticides, etc.) in the soil.

However, known ground working apparatuses that are configured to dispense additives have several drawbacks. For example, these known ground working arrangements typically do not efficiently discharge trash that gets pulled between the coulter disc and the knife. An accumulation of this trash increases opportunities for undesired skidding that diminishes the effectiveness of the rotating coulter blade as it is pulled across the field. Also, a lower end of the knife is customarily integrated with or fixed by a weld to a knife tip that is subject to wear and tear as it is pulled through the soil. Likewise, the conduit or tube mounted on the knife is permanently fixed with a weld to the knife, and is subject to wear and tear in a similar manner as described above in regard to the knife tip. Consequently, the entire knife and conduit arrangement must be replaced periodically.

Therefore, there is a need or desire for a ground working apparatus configured to enhance conditioning and dispensing additives to the soil. The ground working apparatus should be configured to be utilized with a wide variety of agricultural implements. Moreover, the ground working apparatus should be designed so that tools and components that are subject to wear and tear can be readily interchanged.

SUMMARY OF THE INVENTION

The present invention provides a ground working apparatus that meets the desires and needs described above. The ground working apparatus of the present invention thus enhances the soil conditioning and effective dispensing of the agricultural additives to the soil. Moreover, the apparatus of the invention provides for ready interchangeability of tools and/or components that are more subject to wear and tear.

In a first embodiment of the present invention, a ground working apparatus for dispensing an agricultural additive to the soil is provided. The apparatus is mounted to a tool bar that is operable to be towed across an agricultural field in a forward direction of travel. The apparatus includes a coulter blade supported from the tool bar, and a knife element positioned rearward from the coulter blade relative to the forward direction of travel. The apparatus further includes a conduit mounted at the knife element and operable to dispense the agricultural additive to the soil. The conduit or tube is attached by a conduit mount plate to the knife element. The conduit mount plate includes at least one opening extending therethrough and configured to align with an opening extending through the knife element so as to receive at least one fastener operable to interchangeably secure the conduit or tube at the knife element. The ground working apparatus can further include a tip having a female portion with an opening extending through. The opening in the female portion of the tip is configured to align with an opening through a male portion at a lower end of the knife element so as to receive a fastener operable to interchangeably secure the tip to the knife element.

The preferred ground working apparatus further includes a swing arm in rotational support of the coulter blade, and a support arm carrying the knife element from the swing arm. The support arm includes a length with a forward end and a rearward end and that is generally longitudinally aligned relative to the forward direction of travel. The forward end of the support arm affixed to the swing arm, and an upper end of the knife element is attached at the rearward end of the support arm.

In one embodiment, the rearward end of the support arm includes a first pair of openings in generally vertical alignment and that are generally parallel to a second pair of openings. The upper end of the knife element includes an elongated and generally linearly-aligned opening that is configured to align with one of the first and second pair of openings in the support arm so as to receive a pair of fasteners operable to selectively position the knife element along the length of the support arm in a rearward direction from the coulter disc. Alternatively, the upper end of the knife element includes a first elongated knife opening located adjacent and generally parallel to a second elongated knife opening, each first and second knife openings extending in a generally vertical direction. One of the first and second knife openings is configured to align with a pair of openings at the rearward end of the support arm so as to receive a fastener operable to variable position the knife element along a length of the support arm.

The preferred knife element includes a forward edge relative to the forward direction of travel of the apparatus. The forward edge includes a continuous radius of curvature less than a radius of curvature of the coulter blade. The difference in radius of curvatures is such that a distance between the knife element and the coulter blade increases as one travels generally upward along the forward edge of the knife element. The preferred continuous curvature extends from a lower end of the knife element to a mount point generally where the knife element meets the support arm. The knife element and the attached conduit are configured to be adjustable in a vertical direction along the elongated opening at the upper end of the knife such that the knife and attached conduit adjust in a generally vertical direction relative a rotational axis of the coulter blade while generally maintaining a horizontal distance of the knife element from the rotational axis of the coulter blade.

In another embodiment, the present invention provides an agricultural implement for dispensing an agricultural additive to the soil as the implement is pulled in forward direction of travel across an agricultural field. The implement includes a tool bar and ground working apparatus mounted to the tool bar. The ground working apparatus includes a coulter blade supported from the tool bar, and a knife element positioned rearward of the coulter blade. The knife element includes a rearward edge and a forward edge relative to the forward direction of travel. The apparatus further includes a conduit attached at a rearward edge of the knife element and operable to dispense the agricultural additive to the soil. The forward edge of the knife element defines a continuous radius of curvature that is less than a radius of curvature of a circumference of the coulter blade.

The present invention also provides a method of operating a ground working apparatus configured to apply an agricultural additive to the ground in accordance with the above description.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 5 is a detailed view of another embodiment of a conduit associated with the ground working apparatus of the present invention.

DETAILED DESCRIPTION OF THE PREFERRED EMBODIMENTS

Figure 1:
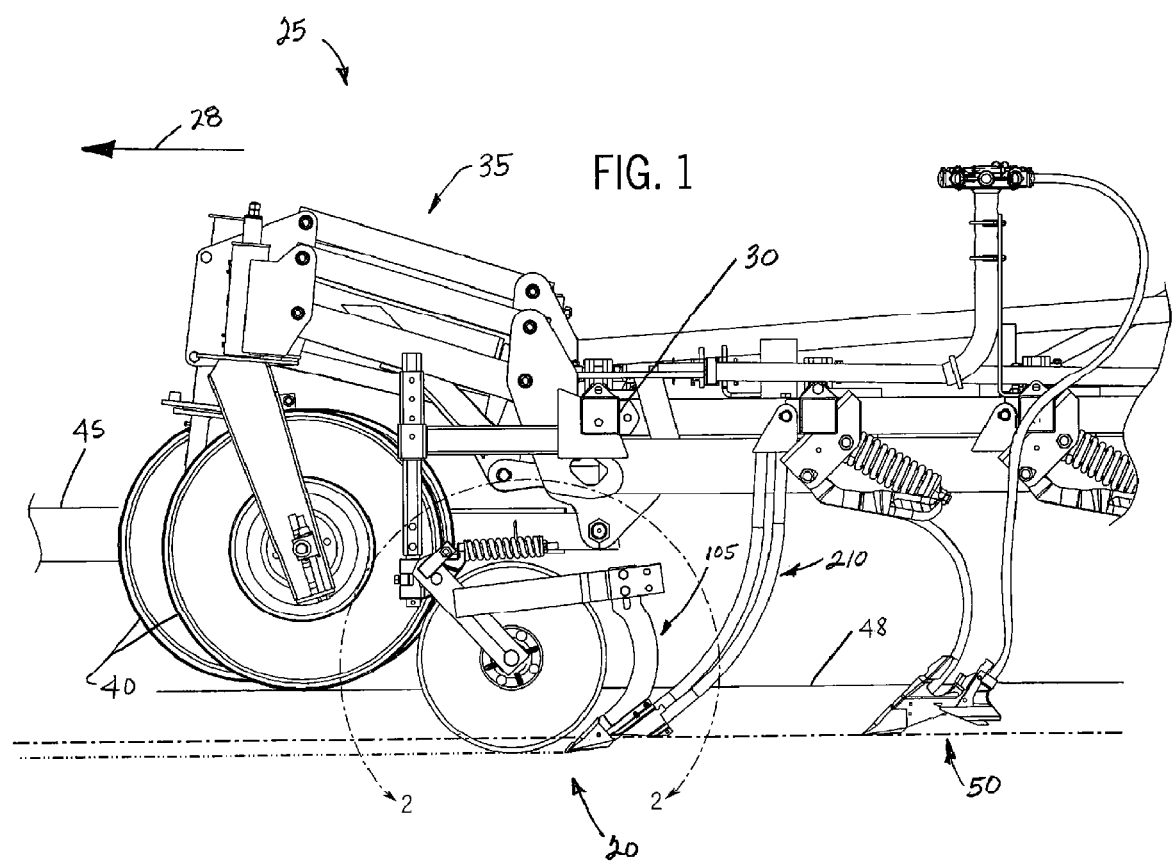
FIG. 1 illustrates a partial side elevation view of an agricultural implement employing one embodiment of the ground working apparatus of the present invention.

Referring to FIG. 1, a preferred embodiment of a ground working apparatus 20 in accordance with the present invention is shown. The ground working apparatus 20 is mounted to an agricultural implement 25 configured to be pulled by a tow vehicle (not shown) across a field in a forward direction of travel (illustrated by arrow 28).

The implement 25 shown is of a conventional type used to apply or dispense an agricultural additive or crop nutrients or animal or human waste (sludge) or the like to soils, typically simultaneously with planting seed.

The agricultural implement 25 includes a toolbar 30 supported by a frame 35 mounted on a series of wheels 40. The tool bar 30 and frame 35 are connected to a tongue arm 45 configured to attach to the tow vehicle (not shown).

Still referring to FIG. 1, the ground working apparatus 20 is configured to dispense a fertilizer or other agricultural additive to the soil as the apparatus 20 passes between adjacent rows where seed is to be planted. A seed dispensing device 50 is located rearward of the ground engaging apparatus 20 and configured in a known manner to dispense seed to a furrow on either side of the apparatus 20. In this manner, the ground working apparatus is operable to enhance soil utilization and conditioning.

Figure 2:
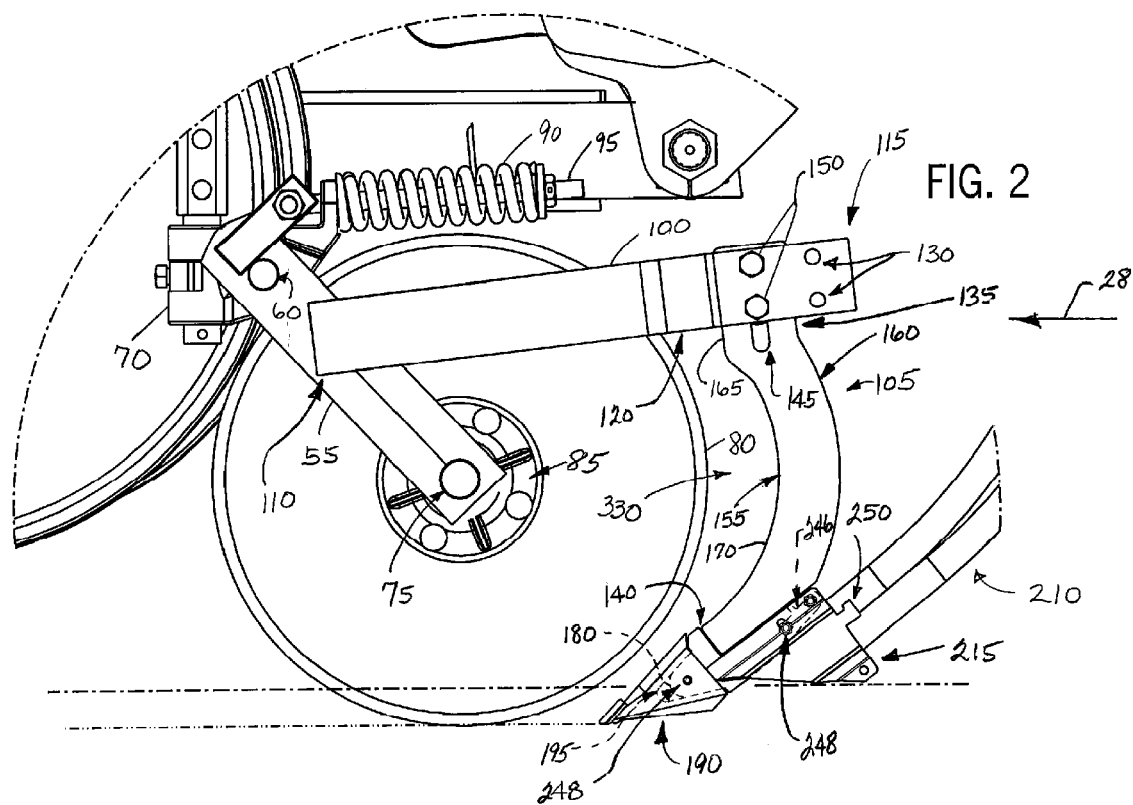
FIG. 2 illustrates a detailed side elevation view of the ground working apparatus illustrated in FIG. 1.
Figure 3:
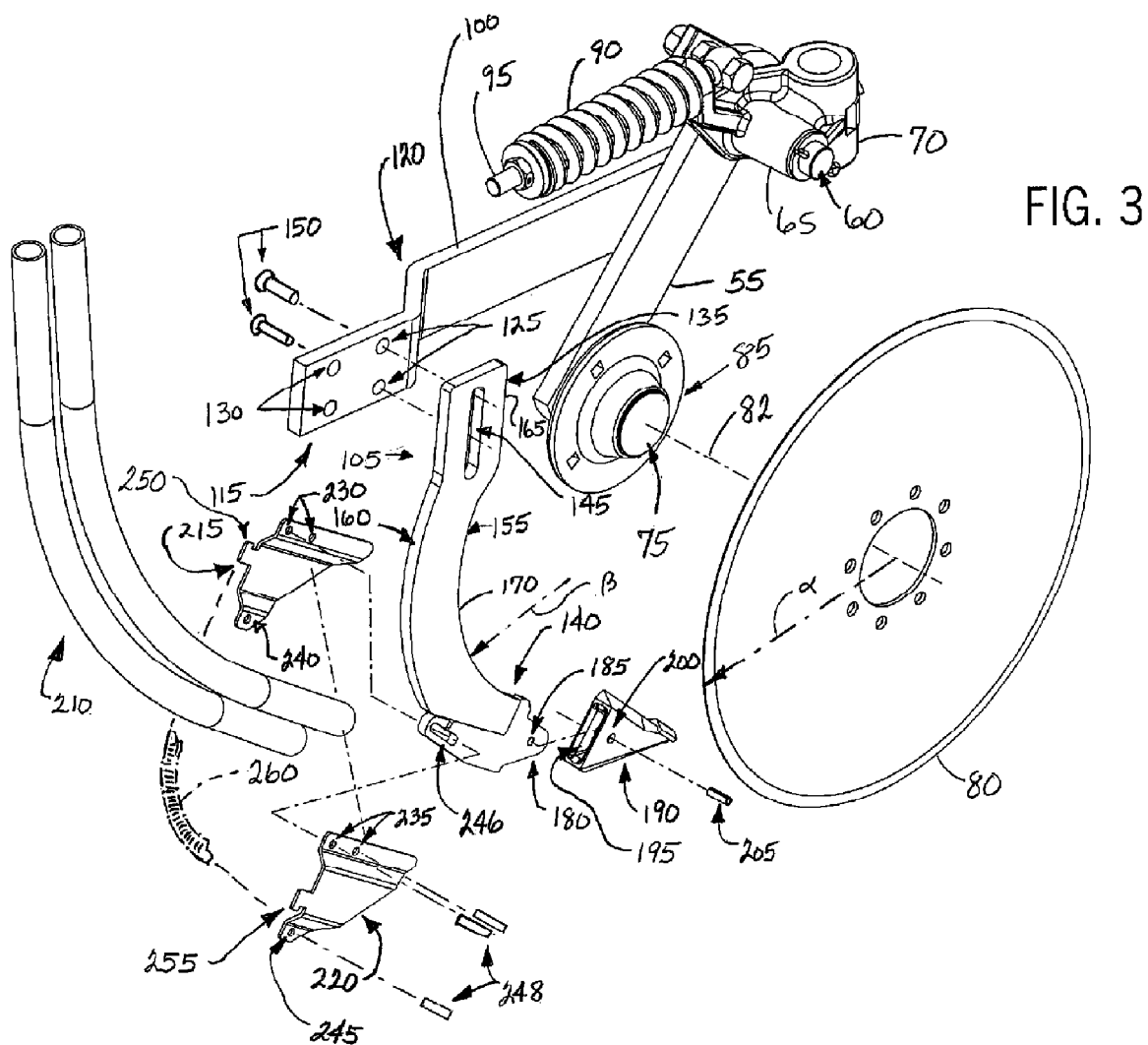
FIG. 3 is an exploded perspective view of the ground working apparatus of the present invention.

Referring to FIGS. 2 and 3, the preferred ground working apparatus 20 generally includes a swing arm 55 supported from the tool bar 30 (See FIG. 1). The swing arm 55 is pivotally supported by a shaft 60 extending through a bushing 65 (see FIG. 3) of a hinge casting 70. The swing arm 55 includes a lower shaft 75 in rotational support of a coulter blade 80 about a rotational axis 82 (see FIG. 3). The coulter blade 80 is generally secured to the lower shaft 75 by a hub assembly 85 in a known manner. A compression spring 90 in combination with a tensioning rod 95 is configured to bias the swing arm 55 and attached coulter blade 80 in a downward direction towards the ground.

Still referring to FIGS. 2 and 3, a support arm 100 in support of a knife element 105 is mounted in a rearward direction from the swing arm 55 and coulter blade 80 relative to the forward direction of travel 28 (See FIG. 2). The support arm 100 includes a forward end 110 and a rearward end 115 and is generally longitudinally aligned. The forward end 110 of the support arm 100 is affixed (e.g., welded) to the swing arm 55. A bend 120 is disposed between the forward end 110 and the rearward end 115 of the support arm 100 such that the knife element 105 is supported generally in-line with the coulter blade 80 in the forward direction of travel 28 of the implement 25. As shown in FIG. 3, one embodiment of the rearward end 115 of the support arm 100 includes a first pair of openings 125 in general vertical alignment and adjacent to a second pair of openings 130.

Still referring to FIGS. 2 and 3, the knife element 105 generally includes an upper end 135 and a lower end 140. The upper end 135 of the knife element 105 includes an elongated opening 145 configured to align with one of the first and second pair of openings 125 and 130 of the support arm 100 so as to receive a pair of fasteners 150 therethrough operable to selectively position the knife element 105 along a length of the support arm 100. The elongated opening 145 is of a length such that the knife element 105 is adjustable in the vertical direction relative to the support arm 100 as well as the rotational axis 82 (See FIG. 3) of the coulter blade 80.

Figure 4:
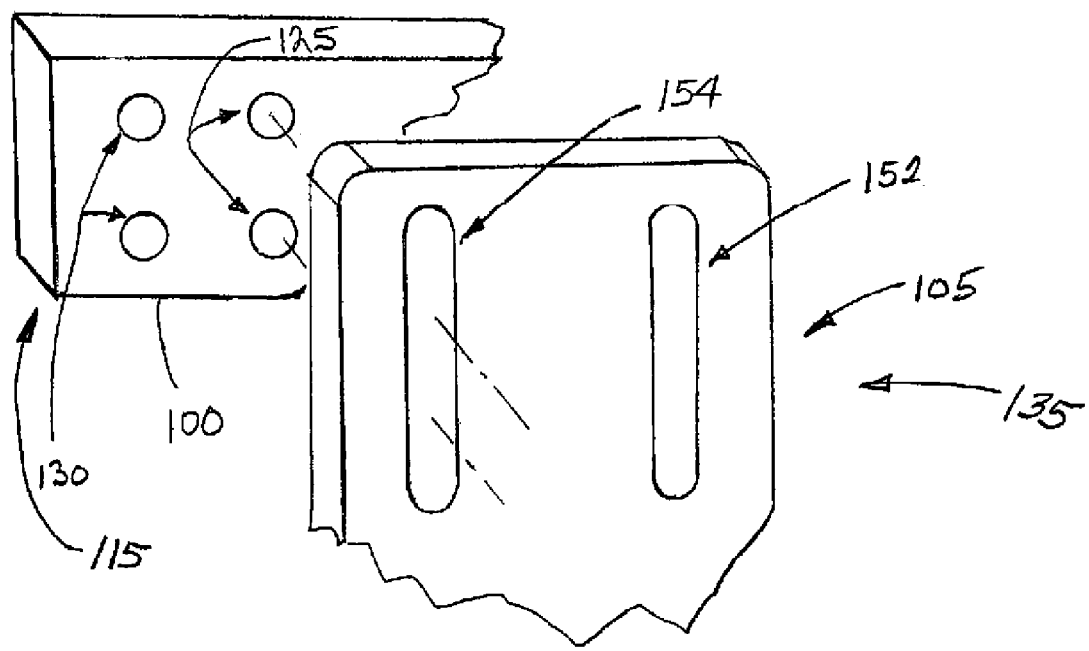
FIG. 4 is a detailed exploded view of another embodiment of a knife element of a ground working apparatus having multiple mounting points in accordance with the present invention.

Although the above-described knife element 105 is described with a single elongated slot 145 configured to align with one of the first pair of openings 125 and 130 at the second end 135 of the support arm 100, the invention is not so limited. In another embodiment as illustrated in FIG. 4, the knife element 105 can include a first elongated opening 152 located adjacent to a second elongated opening 154. Both elongated openings 152 and 154 are generally vertically aligned so as to align with one of a pair of openings 125 and 130 at the rearward end of the support arm 100. In a similar manner to that described above, the fasteners 150 can extend through one of the first and second elongated openings 152 and 154 and through one of the pair of openings 125 and 130 at the second end 115 of the support arm 100 so as to selectively position the knife element 105 along a length of the support arm 100.

Referring back to FIGS. 2 and 3, the preferred knife element 105 further includes a forward edge 155 opposite a rearward edge 160 relative to the forward direction of travel 28 (See FIG. 2) of the implement 25. The forward edge 155 at the upper end 135 of the knife element 105 includes a generally linear portion 165 that extends generally a length of the elongated opening 145. The forward edge 155 of the knife element 105 further includes a continuous curvature portion 170 that extends from the linear portion 165 towards the second end 140 of the knife element 105. The curvature portion 170 is of a continuous radius of curvature ($\beta$) that is less than a radius of curvature ($\alpha$) of a circumference of the coulter blade 80.

Referring specifically to FIG. 3, the lower end 140 of the knife element 105 includes a male portion 180 with an opening 185 extending therethrough. The preferred male portion 180 is welded to the lower end 140 of the knife element 105. Yet, it is understood that the male portion 180 can be of integrated composition with the lower end 140 of the knife element 105 and is not limiting on the invention.

Still referring to FIG. 3, the ground working apparatus 20 further includes a tip 190 having a female portion 195 configured therein to receive the male portion 180 at the lower end 140 of the knife element 105. The tip 190 includes an opening 200 extending therethrough configured to align with the opening 185 through the male portion 180 of the knife element 105 so as to receive a fastener 205 therethrough operable to interchangeably attach the tip 190 at the lower end 140 of the knife element 105. The tip 190 is generally configured to engage the soil, and thus is subject to wear and tear over time. The interchangeability of the tip 190 allows for ready replacement without replacing the entire knife element 105.

Referring again to FIGS. 2 and 3, the ground engaging apparatus 20 further includes a pair of conduits 210 attached at the rearward edge 160 of the knife element 105. The pair of conduits 210 are generally configured to dispense granular agricultural additive to the soil as the implement 25 is pulled across the field. The pair of conduits 210 allow for the increased rate of dispensing granular product so as to provide adequate agricultural additive to both rows on either side of the apparatus 20. The preferred pair of conduits 210 is interchangeably connected by a pair of conduit mounting plates 215 and 220. The pair of conduits 210 is subject to wear and tear during operation in a manner similar to the tip 190 as described above. Thus, the pair of mounting plates 215 and 220 provide for the ready detachment and reattachment of the pair of conduits 210 without replacement of the entire knife element 105.

Referring specifically to FIG. 3, a preferred embodiment of the conduit mounting plates 220 and 225 are configured to receive the pair of conduits 210 therebetween. The left-hand bracket 215 includes at least one upper opening 230, and the right-hand bracket 220 includes at least one upper opening 235. Each bracket 215 and 220 also includes at least one lower opening 240 and 245, respectively. Each of the at least one upper openings 230 and 235 is configured to align with an elongated slot 246 at the rearward edge 160 of the knife element 105, and each of the lower openings 240 and 245 is also configured to align with the other, so as to receive fasteners 248 therethrough operable to interchangeably attach the mounting plates 215 and 220, and the pair of conduits 210 enclosed therebetween, to the knife element 105. The left-hand and right-hand brackets 215 and 220 are generally triangular shaped and of a bent configuration so as to receive the pair of conduits 210 therebetween. The mounting plate 215 includes a tab 250, and the mounting plate 220 includes a tab 255. The tab 250 is generally configured to align with one of the pair of conduits 210, and the tab 255 is generally configured to align with the other of the pair of conduits 210. The tabs 250 and 255 are configured to receive a hose clamp (illustrated in dashed line and by reference 260 in FIG. 3) to provide additional support of the conduits 210 to the knife element 105.

FIG. 5 illustrates another embodiment of a conduit 300 operable to be attached by a conduit mount plate 310 to the knife element 105 of the ground working apparatus 20, in a manner similar to the pair of conduits 210 attached by the mounting plates 215 and 220, at the elongated slot 246 of the knife 105 (See FIG. 3). The conduit 300 is characterized by a smaller diameter, relative to each of the pair of conduits 210, so as to dispense an agricultural additive in the fluid form. The conduit mount plate 310 is generally a plate structure that is generally parallel to the vertical plane and extending in the forward direction relative to forward direction of travel 28 (See FIG. 1). Referring to FIGS. 3 and 5, the mount plate 310 includes a pair of openings 315 configured to align with the elongated slot 246 of the knife element 105 so as to receive fasteners, similar to fasteners 248 described above, therethrough to interchangeably attach the conduit 300 to the knife element 105.

In operation, an operator sets the ground working apparatus 20 in a manner such that the lowest point of the coulter blade 80 is beneath a seed furrow level. The knife element 105 is set at a depth to insure that seed placement is consistent across the implement 25. An agricultural additive is dispensed through the conduits 210 at the rearward edge 160 of the knife element 105 at a depth equal to or deeper than the seed placement. If the moisture conditions are poor, the knife element 105 can be raised to prevent variation in the seed depth. As the implement 25 is pulled by a tow vehicle (not shown) across the field, the pivot assembly allows the coulter blade 80 to freely move while the implement 25 is following the varying terrain of the field. The coulter blade 80 is allowed to caster such that it runs in-line with the direction of travel 28 of the implement 25. The coulter blade 80 is operable to cut the ground in a manner such that the trailing knife element 105 and the attached conduit 210 are operable to dispense the agricultural additive at the desired soil depth to the field.

The knife element 105, positioned rearward of the coulter blade 80, is generally set at a depth such that it does not run lower than the coulter blade 80 itself. Typically, the knife element 105 is set at a depth of about ¼ inch higher than the lowest point of the coulter blade 80. The knife element 105 can be adjusted along the length of its elongated slot 145 so as to accommodate the circumference or diameter of the coulter blade 80.

Under conditions where there is excessive residue caught or trapped between the coulter blade 80 and the knife element 105, an operator can readily reposition the knife element 105 in a rearward direction at the second pair of openings 130 of the support arm 100. The residue can become a problem if it is allowed to follow-up the knife element 105 and plug up the coulter blade 80 so as to result in a loss of ability of the coulter blade 80 to rotate freely on the swing arm 55.

The knife element 105 is placed adjacent to the coulter blade 80. A pinch point where the knife element 105 meets the support arm 100 provides a small clearance such that residue does not wrap-up and around the trailing knife element 105. Yet, inevitably, the residue does rise or follow-up the knife element 105 and increases opportunities to plug the coulter blade 80 and diminishes the ground working apparatus's ability to apply fertilizer appropriately. To solve this problem, the forward edge 155 of the knife element 105 includes a curvature portion 170 of a continuous radius of curvature ($\beta$) that is less than a radius of curvature ($\alpha$) of a circumference of the coulter blade 80. This difference in radius of curvatures ($\beta$) and ($\alpha$) creates a gap 330 (See FIG. 2) between the knife element and coulter blade 80 configured to more readily spill residue to the sides of the knife element 105 without plugging the coulter blade 80.

To provide as much clearance as possible for the spillage of residue, the knife element 105 attaches to the support arm 100 at or near an upper portion (above the rotational axis 82) of the coulter blade 80. The knife element 105 is mounted to one of two pairs of openings spaced along the length of the support arm 100 so as to provide the ability to vary the distance between the coulter blade 80 and the knife element 105 for varying residue conditions (e.g., extremely heavy trash conditions, etc.).

The tip 190 and the conduits 210 located at the lower end 140 of the knife element 105 are subject to wear and tear and/or damage associated with ground working operation of the implement 25. When desired, an operator can readily remove the fastener 205 and interchange or replace the tip 190 without having to replace the entire knife element 105. Likewise, when desired, an operator can readily remove the mounting bracket 215 and 220 from the knife element 105 and interchange or replace the conduits 210, and reattach the mounting brackets 215 and 220 via the fasteners 248 to the knife element 105. If switching to an agricultural additive in a fluid form, the mounting brackets 215 and 220 and associated pair of conduits 210 can be removed and the conduit 300 can be attached by the mount plate 310 via fasteners 248 to the knife element 105 for the dispensing of the fluid form of agricultural additive to the field. In contrast, the tip and conduits of known ground working apparatus are welded at or cast with the knife element and thus require replacement of the entire knife element, which is both more cumbersome and expensive to perform.

Although the above described ground working apparatus 20 is described with reference to an agricultural implement 25 for planting, the invention is not so limited. The ground working apparatus 20 can be employed with implements configured for a variety of uses (e.g., cultivating, etc.) and is not limiting on the invention. Also, it is understood that the type of additives (crop nutrients, dry or liquid fertilizer, pesticides, herbicides, etc.) dispensed by the ground working apparatus 20 to the soil can vary.

Many changes and modifications could be made to the invention without departing from the spirit thereof. The scope of these changes will become apparent from the appended claims.

We claim:

1. A method of operating a ground working apparatus configured to dispense an agricultural additive to the soil, the method comprising the steps of:
   splitting the soil with a coulter blade supported from the tool bar and configured to engage the soil;
   working the soil with a knife element positioned rearward from the coulter blade relative to the forward direction of travel;
   dispensing the agricultural additive to the soil though at least one conduit mounted at the knife element;
   utilizing at least one conduit mount plate configured to attach the at least one conduit at the knife element, wherein removal of the at least one conduit mount plate and at least one conduit from the implement does not cause removal of the knife element from the implement;
   providing a swing arm pivotally supported from the tool bar and in rotational support of the coulter blade; and
   allowing a support arm having a forward end and a rearward end relative to the forward direction of travel, wherein the forward end of the support arm is affixed to the swing arm, and wherein the rearward end of the support arm is mounted at an upper end of the knife element, wherein the rearward end of the support arm includes a first pair of arm openings in general vertical alignment and generally parallel to a second pair of arm openings located adjacent thereto, and wherein the upper end of the knife element includes a first elongated knife opening located adjacent and generally parallel to a second elongated knife opening, each first and second knife openings extending in a generally vertical direction, and wherein one of the first and second knife openings is configured to align with one of the first and second pair of arm openings of the support arm so as to receive a fastener therethrough operable to variably position the knife element along a length of the support arm.

2. The method of overaling a ground working apparatus of claim 1, wherein the at least one conduit is only fastened by the at least one conduit mount plate at a rearward edge of the knife element.

* * * * *